US012704979B2

United States Patent
(12) Kupershmidt et al.

(10) Patent No.: US 12,704,979 B2
(45) Date of Patent: Aug. 11, 2026

(54) ACCESS-PROTECTION CONTROL FOR NON-VOLATILE MEMORY

(71) Applicant: Mellanox Technologies, Ltd., Yokneam (IL)

(72) Inventors: Haim Kupershmidt, Or Yehuda (IL); Yuval Itkin, Zoran (IL); Mark Luko, Herzliya (IL); Boaz Shahar, Ra'anana (IL); Uri Maor, Ramot (IL); Gabi Liron, Yokneam Illit (IL); Alex Shargorodsky, Rekhasim (IL); Oded Golombek, Even Yehuda (IL); Yair Porat, Bruchin (IL); Matan Eliyahu, Ashdod (IL); Denys Vinnyk, Bila Tserkva (UA); Alon Schneider, Tel Aviv (IL)

(73) Assignee: Mellanox Technologies, Ltd, Yokneam (IL)

( * ) Notice: Subject to any disclaimer, the term of this patent is extended or adjusted under 35 U.S.C. 154(b) by 0 days.

(21) Appl. No.: 18/974,843

(22) Filed: Dec. 10, 2024

(65) Prior Publication Data

US 2026/0161306 A1 Jun. 11, 2026

(51) Int. Cl.
*G06F 3/06* (2006.01)

(52) U.S. Cl.
CPC .......... *G06F 3/0622* (2013.01); *G06F 3/0637* (2013.01); *G06F 3/0679* (2013.01)

(58) Field of Classification Search
CPC ......... G06F 3/0637; G06F 3/062–0623; G06F 3/0679; G06F 21/71; G06F 21/78; G06F 12/14–1491
See application file for complete search history.

(56) References Cited

U.S. PATENT DOCUMENTS 6,336,187 B1 * 1/2002 Kern .................. G06F 21/1077 713/168
7,054,990 B1 * 5/2006 Tamura .................... G11C 7/24 711/112
8,190,919 B2 * 5/2012 Natarajan ........... G06F 12/1441 713/193
2014/0068158 A1 * 3/2014 Cheng .................... G11C 29/82 711/103
2019/0227827 A1 * 7/2019 Zmudzinski ............ G06F 21/57
2023/0129539 A1 * 4/2023 Dover .................. G06F 3/0679 711/154

* cited by examiner

*Primary Examiner* — Khoa D Doan
(74) *Attorney, Agent, or Firm* — Meitar Patents LTD.; Daniel Kligler

(57) ABSTRACT

An electronic device includes a memory interface and a Non-Volatile memory (NVM) controller. The memory interface is to communicate with an NVM. The NVM controller is to manage reading and writing of data in the NVM, to hold one or more Access-Protection (AP) policies that are defined for one or more respective AP requestors, and to permit or deny access to given data in the NVM in accordance with an AP policy defined for an AP requestor that requested the access to the given data.

14 Claims, 6 Drawing Sheets

FIG. 2

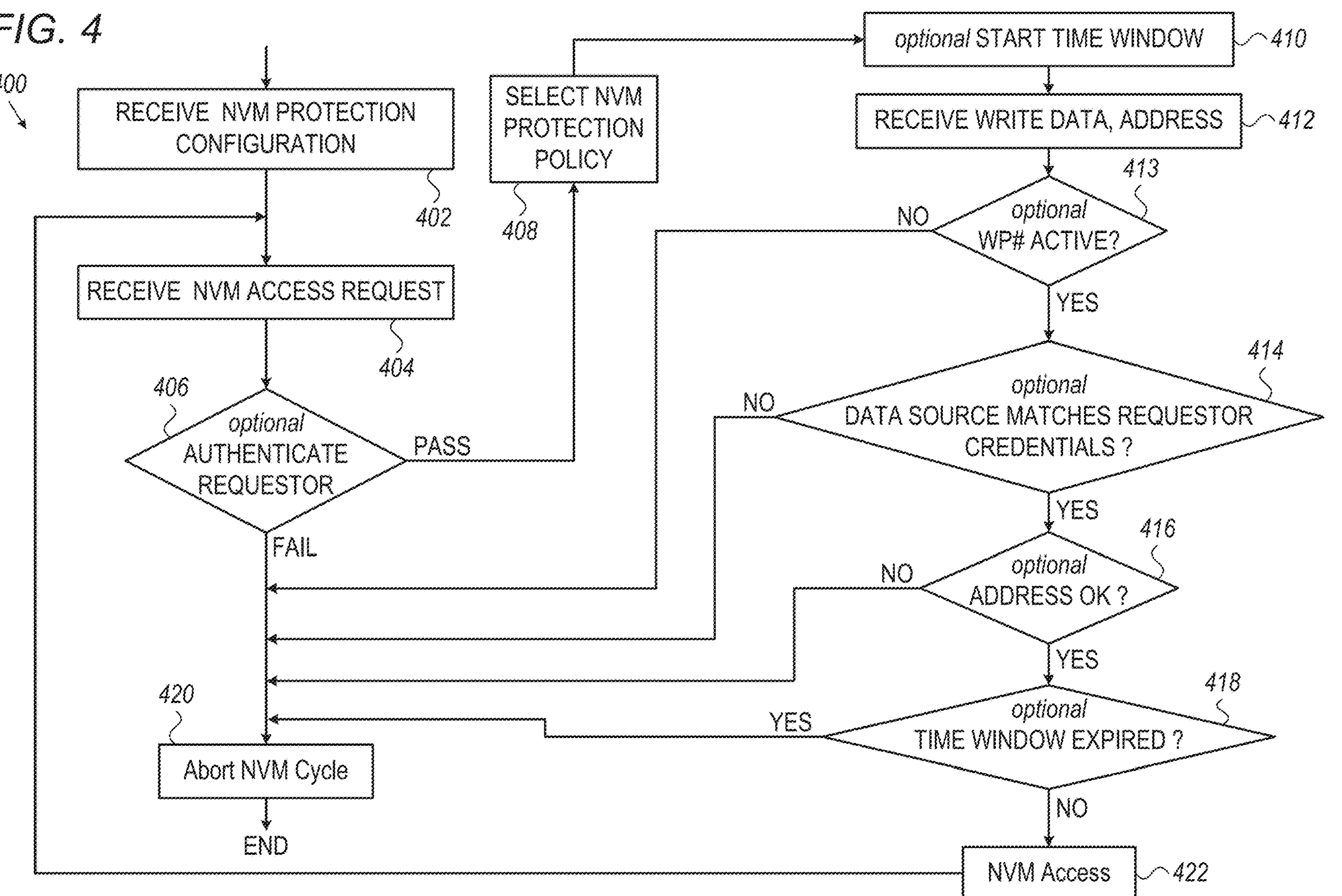
FIG. 4
400
RECEIVE NVM PROTECTION CONFIGURATION
402
SELECT NVM PROTECTION POLICY
408
optional START TIME WINDOW
410
RECEIVE WRITE DATA, ADDRESS
412
413
optional WP# ACTIVE?
NO
YES
RECEIVE NVM ACCESS REQUEST
404
406
optional AUTHENTICATE REQUESTOR
PASS
FAIL
414
optional DATA SOURCE MATCHES REQUESTOR CREDENTIALS ?
NO
YES
416
optional ADDRESS OK ?
NO
YES
420
Abort NVM Cycle
END
418
optional TIME WINDOW EXPIRED ?
YES
NO
NVM Access
422

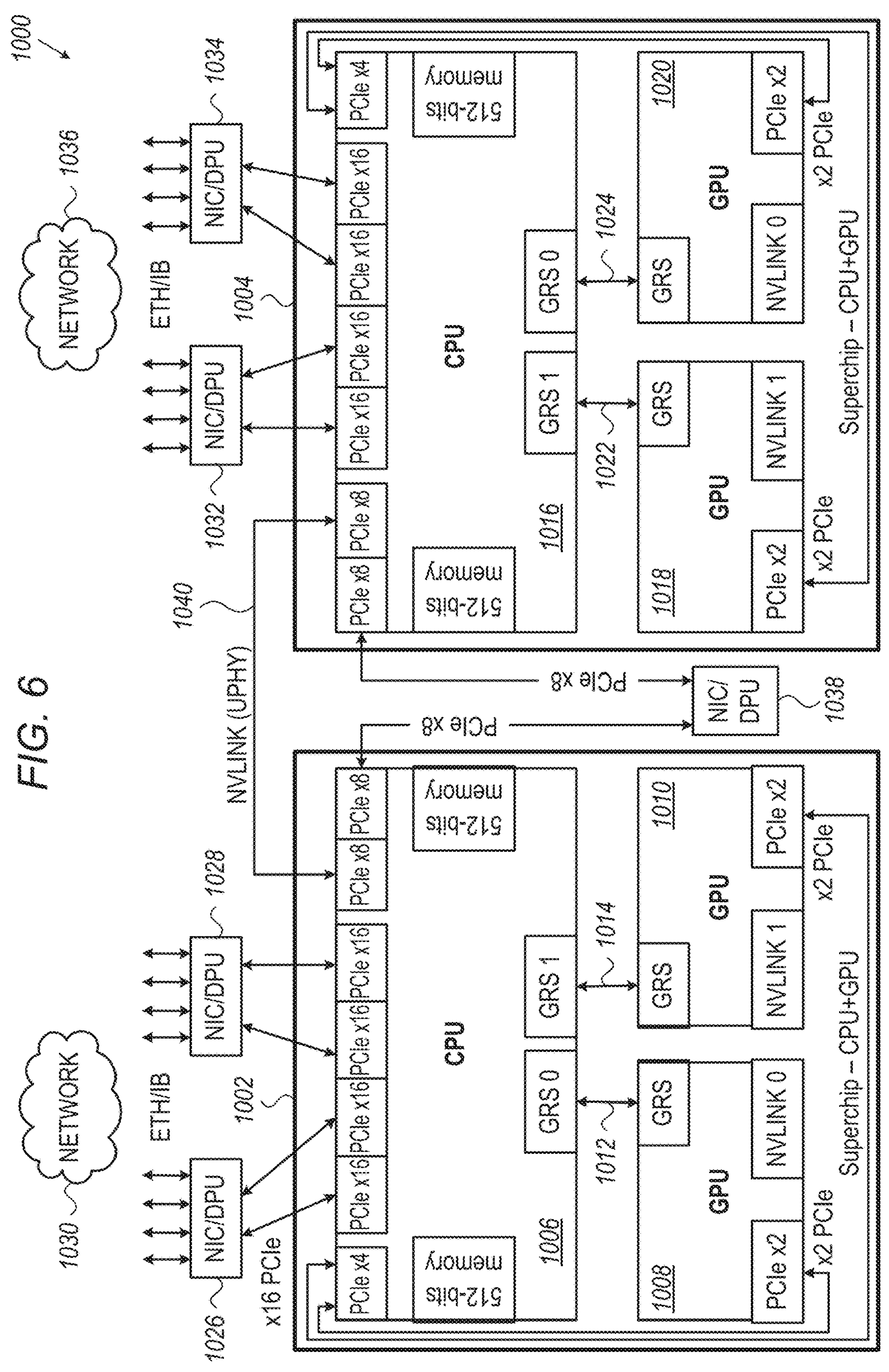
FIG. 6
1000
NETWORK
1036
ETH/IB
NIC/DPU
1034
NIC/DPU
1032
1004
PCIe x4
PCIe x16
PCIe x16
PCIe x16
PCIe x16
PCIe x8
PCIe x8
512-bits memory
512-bits memory
CPU
1016
GRS 0
GRS 1
1024
1022
GRS
GRS
GPU
GPU
1020
1018
NVLINK 0
NVLINK 1
PCIe x2
PCIe x2
x2 PCIe
x2 PCIe
Superchip – CPU+GPU
1040
NVLINK (UPHY)
PCIe x8
PCIe x8
NIC/DPU
1038
NETWORK
1030
ETH/IB
NIC/DPU
1026
NIC/DPU
1028
x16 PCIe
1002
PCIe x4
PCIe x16
PCIe x16
PCIe x16
PCIe x16
PCIe x8
PCIe x8
512-bits memory
512-bits memory
CPU
1006
GRS 0
GRS 1
1012
1014
GRS
GRS
GPU
GPU
1008
1010
NVLINK 0
NVLINK 1
PCIe x2
PCIe x2
x2 PCIe
x2 PCIe
Superchip – CPU+GPU

ACCESS-PROTECTION CONTROL FOR NON-VOLATILE MEMORY

TECHNICAL FIELD

The present disclosure relates generally to computer system security, and specifically to the protection of nonvolatile memory in computer systems against malicious or accidental access.

BACKGROUND

Non-Volatile Memory (NVM), such as Flash memory and Electrically-Erasable-Programmable Read Only Memory (EEPROM) are typically used in computer systems for the storage of sensitive firmware (FW) such as boot-code and others. For some background on how computer systems are today protected against malicious or accidental write of sensitive non-volatile memories, see NVIDIA DRIVE OS 5.1 Linux SDK, Release 5.1.6.1 (publication PR-08890-5.1, Published date: Nov. 6, 2019), the chapter titled "Understanding Security".

SUMMARY

An embodiment that is described herein provides an electronic device including a memory interface and a Non-Volatile memory (NVM) controller. The memory interface is to communicate with an NVM. The NVM controller is to manage reading and writing of data in the NVM, to hold one or more Write-Protection (WP) policies that are defined for one or more respective WP requestors, to receive a WP indication, and to permit or deny writing of given data to the NVM in accordance with a WP policy defined for a WP requestor that requested the writing of the given data, the WP policy depending at least on the WP indication.

In some embodiments the electronic device further includes one or more processors, to request access to the NVM. In some embodiments, the WP policy specifies a set of addresses in the NVM to which writing is protected. In a disclosed embodiment, the set of addresses is non-contiguous.

In an embodiment, the one or more WP policies include (i) a first WP policy, defined for a first WP requestor, the first WP policy specifying a first set of addresses in the NVM to which writing is protected, and (ii) a second WP policy, defined for a second WP requestor, the second WP policy specifying a second set of addresses in the NVM to which writing is protected, the second set being different from the first set.

In some embodiments, in accordance with the WP policy, the NVM controller is to authenticate an identity the WP requestor. In some embodiments, in accordance with the WP policy, the NVM controller is to authenticate written data that is subject to the WP policy.

There is additionally provided, in accordance with an embodiment that is described herein, an electronic device including a memory interface and a Non-Volatile memory (NVM) controller. The memory interface is to communicate with an NVM. The NVM controller is to manage reading and writing of data in the NVM, to hold one or more Access-Protection (AP) policies that are defined for one or more respective AP requestors, and to permit or deny access to given data in the NVM in accordance with an AP policy defined for an AP requestor that requested the access to the given data.

There is also provided, in accordance with an embodiment that is described herein, a method for Write Protection (WP) for a Non-Volatile memory (NVM). The method includes holding one or more WP policies that are defined for one or more respective WP requestors, and receiving a WP indication. writing of given data to the NVM is permitted or denied in accordance with a WP policy defined for a WP requestor that requested the writing of the given data, the WP policy depending at least on the WP indication.

There is further provided, in accordance with an embodiment that is described herein, a method for Access Protection (AP) for a Non-Volatile memory (NVM). The method includes holding one or more AP policies that are defined for one or more respective AP requestors. Access to given data in the NVM is permitted or denied in accordance with an AP policy defined for an AP requestor that requested the access to the given data.

The present description will be more fully understood from the following detailed description of the embodiments thereof, taken together with the drawings in which:

BRIEF DESCRIPTION OF THE DRAWINGS

FIG. 2 is a flowchart that schematically illustrates a method for write protection of an NVM in an electronic device, in accordance with an embodiment that is disclosed herein;

FIG. 4 is a flowchart that schematically illustrates a method for allowing NVM Write operations, in accordance with an embodiment that is disclosed herein;

FIG. 6 is a block diagram that schematically illustrates a computing system, in accordance with an embodiment that is described herein.

DETAILED DESCRIPTION OF EMBODIMENTS

Overview

Figure 1:
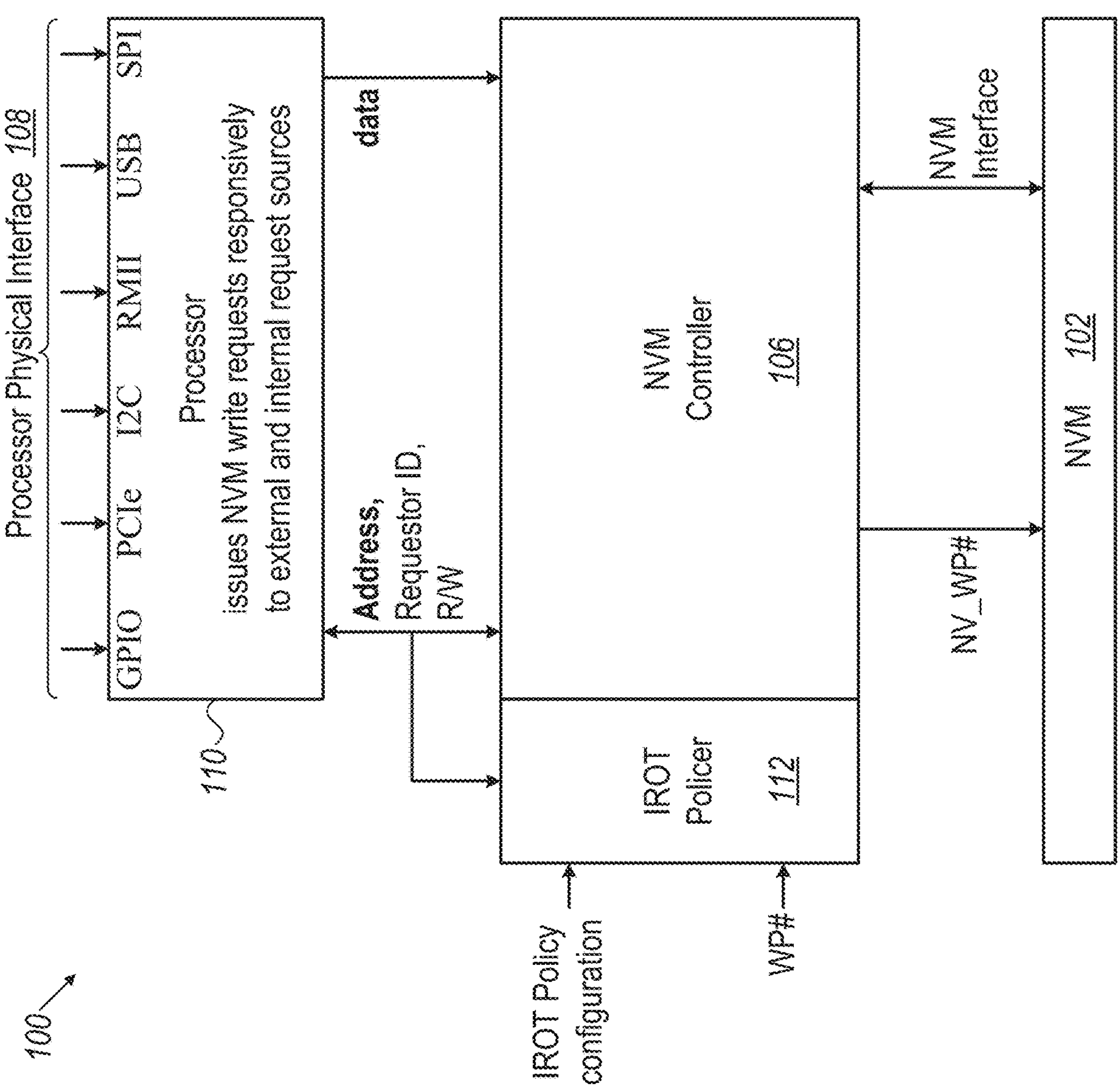
FIG. 1 is a block diagram that schematically illustrates an electronic device that allows secure and flexible NVM write operations, in accordance with an embodiment that is disclosed herein.

Electronic devices such as computing systems sometimes include a Non-Volatile Memory (NVM) such as a Flash memory or an Electrically Erasable Programmable Read-Only Memory (EEPROM), electric fuses, and others. The NVMs are typically used to store firmware, BIOS, or similar critical components, and must be protected from unauthorized write operations for several important reasons:

1. Security and Integrity: Unauthorized accesses (and in particular modifications) to NVM can compromise the security and integrity of the entire system. Malicious changes could introduce vulnerabilities, backdoors, or malware that could be used to exploit the system, steal data, or disrupt operations.

2. System Stability: NVM often contains firmware or configuration data essential for the stable operation of hardware components. Unauthorized changes can lead to instability, crashes, or malfunctions, potentially rendering the system unusable or unreliable.

3. Maintaining Authenticity: Ensuring that NVM can only be modified by authorized personnel or processes helps maintain the authenticity of the firmware and software running on the system. This is crucial for verifying that the software loaded onto the processor is legitimate and has not been tampered with.

4. Compliance and Standards: Many industries and regulatory bodies impose requirements for protecting firmware and NVM. Compliance with standards such as PCI DSS (Payment Card Industry Data Security Standard) or various government regulations often necessitates stringent controls over who can modify critical system components.

5. Data Protection: Some NVM might store encryption keys or other sensitive data. Unauthorized modifications could replace such keys and, thus, compromise the security of the computer system.

To address these concerns, processors may conventionally use hardware-based security mechanisms such as External Root of Trust (EROT) (or, sometimes, security circuits in a Baseboard Management Controller (BMC) or in a Host Management Controller (HMC)). In such an application, one or more write request sources issue an NVM Access request, and, for NVM Write, an external circuit releases WP # signal (negative-logic write-protect, equivalent to positive-logic do-not-write-protect).

In such conventional applications, a trusted hardware circuit (e.g., an EROT, a BMC or an HMC) authenticates the NVM access request and allows NVM-write operations if a given set of security requirements is met. For example, the EROT may allow writing to a predefined address range and disallow write operations to any other ranges; for another example, the EROT may allow NVM write operations after verifying a signature of the write data. For brevity, the NVM-Access Request sources will be sometimes referred to herein below as Requestors.

The functionality achieved by such conventional schemes, however, may be limited. For example, the schemes do not support non-contiguous protected areas in the NVM, and do not allow multiple NVM-write sources with different protection maps.

If additional circuitry were to be used to extend the functionality of the WP # signal, e.g., to add non-contiguous address space support, the system would become prone to hacking; in addition, checking the address and/or data on-line may slow down the NVM write operations.

Embodiments that are described herein provide methods and systems to protect an NVM in an electronic device against unauthorized access (read or write). In embodiments, non-contiguous write and read protected areas can be defined, separately for each NVM-access requestor. Thus, in embodiments a the risk of external hacking is mitigated, with little or no effect on speed.

In an embodiment, the electronic device comprises an NVM Controller that is controlled by an Internal-Root-of-Trust circuit (IROT), and a processor. The processor receives one or more NVM access Requests from Access-NVM-Request sources ("requestors"), and sends NVM Read or Write requests to the NVM Controller responsively to the external NVM access requests, or to processor-initiated NVM read or write requests. The IROT is pre-configured (e.g., during system boot) with a protection policy (also referred to as NVM protection policy) for one or more of the requestors. When the NVM Controller receives from the processor an NVM Access Request, the NVM Controller selects a Read or Write protection policy according to the requestor, and verifies that the NVM Access requests adheres to the selected protection policy; For Write request, the policy may include verifying that the WP # signal is active.

In embodiments, an external circuit activates the WP # input to allow the dependent policies to execute the NVM write. The write data, address and possible other parameters are provided by the processor.

In some embodiments, the protection policies may include one or more of the following: checking the requestor credentials, checking that the read or write address is within an allowed range (for the current requestor), validating a data signature, checking that a timer has not expired, and others. In an embodiment, independent sets of NVM address ranges can be defined for each requestor.

Thus, in embodiments to be described below, flexible NVM write protection schemes can be defined and used for a plurality of requestors.

System Description

Electronic devices often include non-volatile memory (NVM) such as Flash, Electrically Erasable Programmable Read Only Memory EEPROM), Fuse Read-Only Memory (F-ROM) and others. For example, a Network Interface Controller (NIC) may comprise a Flash memory for Firmware (FW) storage, and an EEPROM to store serial numbers and security keys. Embodiments to be disclosed below comprise circuitry to facilitate safe, hacker-resilient write operations into the NVM while allowing a plurality of requestors with different protection schemes, supporting a non-contiguous protected NVM address space and a hierarchical protection scheme. In some embodiments, the electronic device comprises a Network Interface Controller (NIC); in other embodiments, the electronic device may comprise a host channel adapter (HCA) and in yet other embodiments the electronic device may comprise various types of computer systems.

FIG. 1 is a block diagram that schematically illustrates an electronic device 100, which allows secure and flexible NVM write operations, in accordance with an embodiment that is disclosed herein. The electronic device comprises a Non-Volatile Memory (NVM) 102.

According to the example embodiment illustrated in FIG. 1, NVM 102 is accessed only through an NVM Controller 106, which authorizes the NVM write operations according to a set of policies; thus, the risk of malicious or accidental writing of the NVM can be mitigated (in some embodiments, NVM Controller 106 handles NVM communication protocols, addressing and data transfers, error correction, wear leveling, voltage level translation and other functions).

Multiple NVM-write requestors 108 are connected to a processor 110 through multiple ports; for example, some requestors may send NVM write requests through one or more General Purpose Input Output (GPIO) ports of the processor; other requestors may use Peripheral Component Interconnect Express (PCIe) ports, Universal Serial Bus (USB) ports, Inter-Integrated-Circuit (I2C) ports, Reduced Media Independent Interface (RMII) ports, Serial Peripheral Interface (SPI) ports, and others.

In some embodiments, processor 110 may comprise a Central Processing Unit (CPU), a Graphic Processor Unit (GPU), a Data Processing Unit (DPU), or a group of processors, of the same or of different types, having a Reduced Instruction Set (RISC) architecture, a Complex Instruction Set (CISC) architecture or any other suitable architecture.

The multiple NVM-write requestors send NVM write requests to the processor; in some embodiments, some or all the requestors may issue the write address and the write data; in other embodiments, the address and/or data may be provided directly to other circuits of electronic device 100, which will be described below. Processor 110 may Read data from the NVM (e.g., to execute FW that is stored in the NVM), by sending NVM Read requests to the NVM Controller. In an embodiment, the read requests include a start address and a size indication; in response, the NVM Controller will issue one or more corresponding NVM read cycles to NVM 102 through NVM Interface 104 and send the read information back to the processor.

Electronic Device 100 further comprises an Internal Root of Trust (IROT) circuit 112 that is preconfigured to set protection configurations for various NVM Write and Read Requestors, typically upon system reset. The configuration may include policy definition for each requestor ID (e.g., address range tables, active WP # input, etc.). In some embodiments, IROT 112 is part of NVM Controller 106.

The processor may also issue an NVM write request to the NVM Controller, either when the processor needs to write to the NVM or responsively to an NVM write request that the processor receives from the requestors. In embodiments, the NVM Write Request that the processor sends to the NVM Controller comprises one or more of the following indications:

1. A Requestor ID (either one of the NVM Write Requests 108 or an ID for a request that is initiated by the processor)
2. The target NVM address (or address-range).
3. The data to be written.
4. A timeout indication, specifying a time window in which the NVM will be open to Write operation The NVM Controller receives NVM Write Requests from the processor and a WP # signal that a user (typically external to the electronic device) may provide. According to some selected protection policies, if the WP # signal is not active, the NVM Controller 106 will deny any NVM Write request. If the WP # signal is active, the NVM Controller will, according to the Requestor ID, select a protection policy from a predefined set of protection policies, and allow or disallow the NVM write request accordingly. For example, in an embodiment, the policy for NVM Write requests that are initiated by the processor is to allow all accesses within a predefined address range, whereas the policy for requests that are received through the USB port is to authenticate the data, and then allow writing into a preset address range and during a preset time window (other examples will be provided below, with reference to FIG. 4).

Thus, according to the example configuration illustrated in FIG. 1 and described herein above, all write operations to the NVM are governed by NVM Controller 106, which is able to provide separate protection policies according to the requestor.

The configuration of electronic device 100 illustrated in FIG. 1 and described herein above is cited by way of example. Other configurations may be used in alternative embodiments. For example, in some embodiments all NVM write requests are initiated by Processor 110. In some embodiments, the address and/or data of the NVM write requests are wired directly to the NVM Interface (for some or for all the requestors). In an embodiment, there is no Processor 110; instead, external NVM Access requestors send request, address and data lines to NVM Controller 106.

Figure 2:
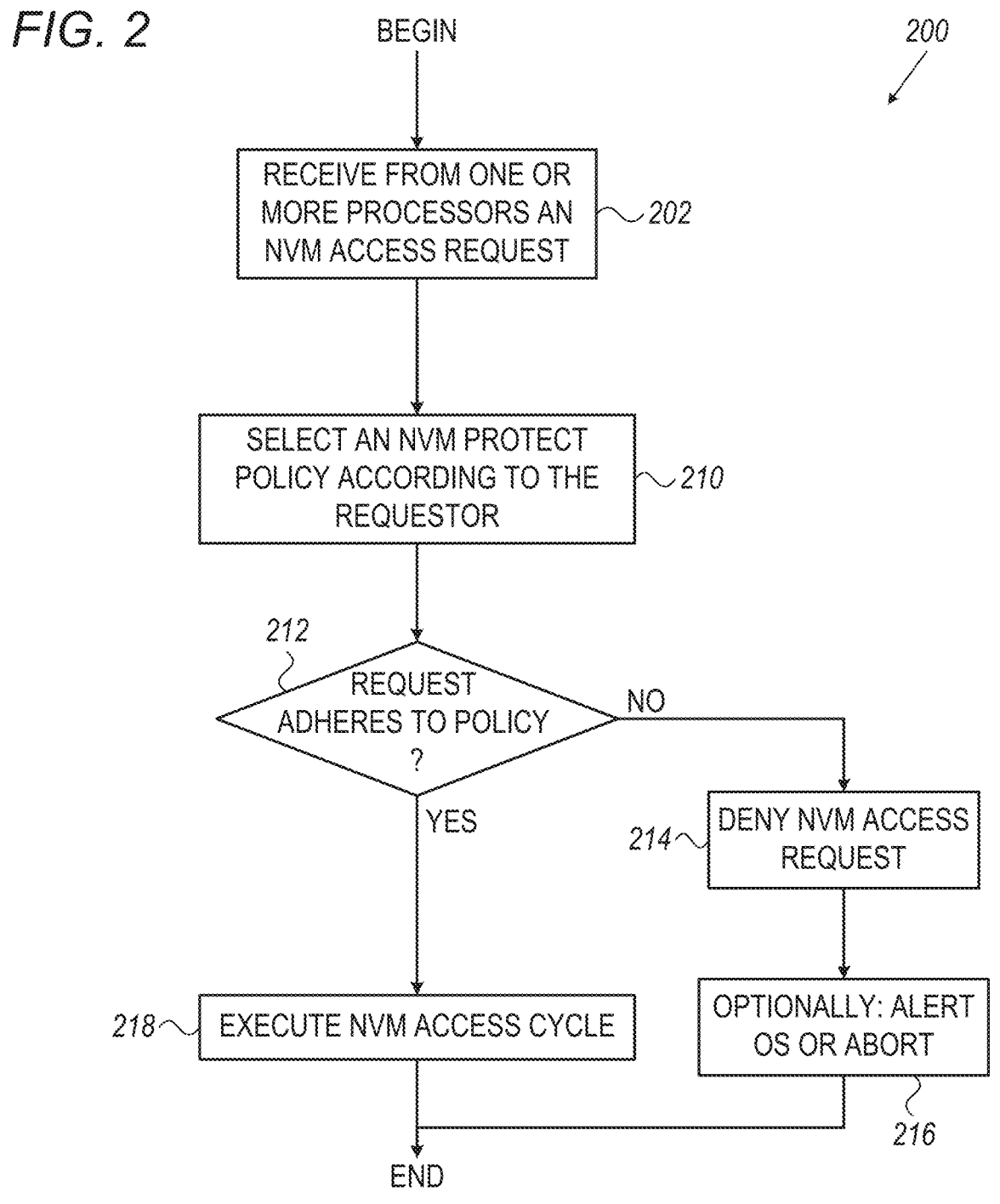

FIG. 2 is a flowchart 200 that schematically illustrates a method for access protection of an NVM in an electronic device, in accordance with an embodiment that is disclosed herein. The flowchart is executed by NVM Controller 106 (FIG. 1).

The flowchart starts at a Receive-NVM-Access-Request operation 202, wherein the NVM Controller receives an NVM access request, for example a write request or a read request, e.g., from a processor. Then, the NVM Controller enters a Select-Policy operation 210 and selects an NVM-Protect policy according to the requestor ID; in embodiments, the NVM Controller comprises a policy table, preprogrammed by IROT 112 (FIG. 1). For example, in some cases the table may specify that unlimited NVM write operations to the lower half of the NVM are allowed when the requestor ID is an operating-system, and to a limited area within the NVM, within a preset time window, when the request originates from the USB port (other policy examples will be described below, with reference to FIG. 4).

Next, at a Check-Policy-Adherence operation 212, the NVM Controller checks whether the access request adheres to the policy set for the requestor ID. In some cases, to check adherence to policy, the NVM controller requests an authentication service from the IROT; for example, when the policy includes the checking of a signature. In the case of a Write access request, the policy may include checking that the WP # input is active.

If, in operation 212, the access request does not adhere to the selected policy, the NVM Controller will enter a Deny-NVM-Access operation 214 and deny the NVM access request (for example, the NVM Controller may signal a Request-Denied to the processor). In some embodiments the NVM Controller will also, at an Alert OS operation 216, alert the operating system that an unauthorized NVM access operation has been attempted, for example, using an Interrupt input of the processor. In an embodiment, the NVM Controller may Abort or Reset the processor (and/or other circuits of the electronic device).

If in operation 212, the access request adheres to the selected policy, the NVM Controller enters an Execute-NVM-Access operation 218, and executes the requested NVM access.

After either operation 216 or operation 218 (or, when there is no operation 216, after operation 214), the flowchart ends.

The configuration of Flowchart 200, illustrated in FIG. 2 and described herein above is cited by way of example. Other flowcharts may be used in alternative embodiments. For example, in some embodiments, no requestor ID is sent-instead, the processor signals each request separately, with a dedicated request signal.

In the present context, write protection and/or read protection are referred to herein as "access protection" (AP). In some embodiments, the NVM controller holds one or more AP policies (i.e., write and/or read protection policies) that are defined for one or more respective AP requestors. The NVM controller permits or denies accessing (reading and/or writing) given data in the NVM in accordance with an AP policy defined for an AP requestor that requested accessing the given data.

Figure 3:
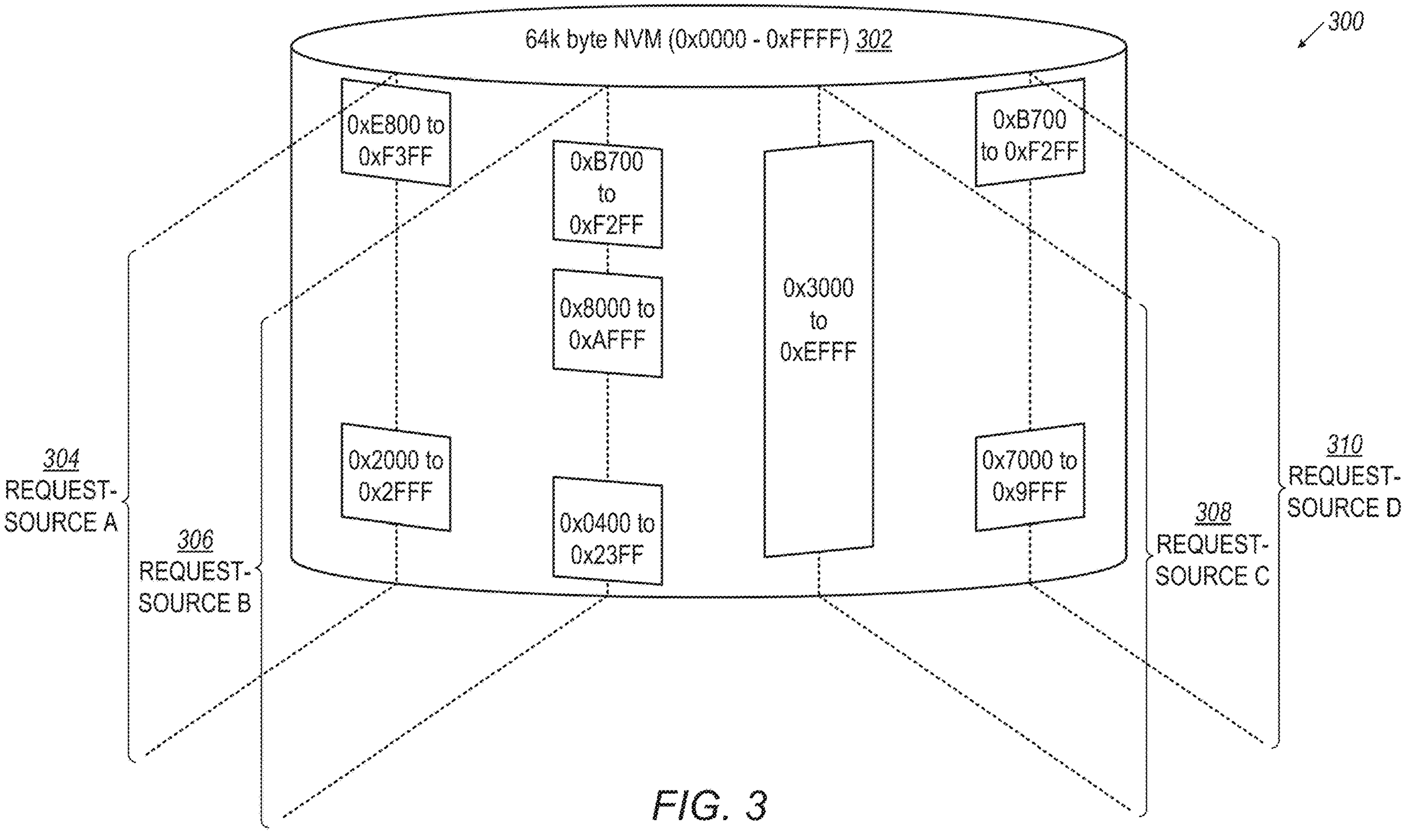
FIG. 3 is a block diagram that schematically illustrates a flexible multi-requestor NVM protection map, in accordance with an embodiment that is disclosed herein.

FIG. 3 is a block diagram that schematically illustrates a flexible multi-requestor NVM protection map 300, in accordance with an embodiment that is disclosed herein. According to the example embodiment illustrated in FIG. 3, the NVM comprises 0x10000 addresses (65536), from 0x0000 to 0xFFFF (other sizes may be used in alternative embodiments). In a given configuration of the Electronic Device, IROT 112 (FIG. 1) preconfigures NVM Controller 106 to support four NVM Write Requestors-a Requestor A 304, a Requestor B 306, a Requestor C 308 and a Requestor D 310 (any other suitable number of NVM Write request sources may be used in alternative embodiments).

According to the example embodiment illustrated in FIG. 3, the allowed NVM-Write address ranges, for Requestor A 304 are 0x2000-0x2FFF and 0xB8000-0xF3FF; the address ranges for Requestor B 306 are 0x0400-0x23FF, 0x8000-0xAFFF and 0xB700-0xF2FF; the address range for Requestor C 308 is 0x3000-0xEFFF; and, the address ranges for Requestor D 310 are 0x7000-0x9FFF and 0xB700-0xF2FF.

Thus, according to the example embodiment illustrated in FIG. 3 and described hereinabove, separate independent sets of address ranges can be defined for a plurality of NVM Write request sources.

Example Use Case

In embodiments, multiple protection policies may be configured for multiple WP requestors. The following example describes an example policy for Firmware (FW) updates that relies on a time-limit.

In an exemplary Network Interface Controller (NIC), the Firmware, (e.g., a boot program) is stored in a Flash memory. The NIC vendor may provide FW updates to some or all the installed NICs. The vendor sends the new FW over the Internet, to be written by a processor into the Flash.

The protection policy for this case may include sender authentication (not part of the present disclosure), verification of the new FW signature, and a time-limit. To load the new FW, the user need to activate a WP # input (if the selected policy requires WP # active) and, responsively, the NVM Controller checks the signature of the write data, and then (if the signature is good), opens the Flash to write operations for a limited time duration as defined by the protection policy time-out parameter. The actual write-data and addresses will be provided by the processor.

FIG. 4 is a flowchart 400 that schematically illustrates a method for allowing NVM Write operations, in accordance with an embodiment that is disclosed herein. The flowchart is executed by NVM Control Circuit 106 (FIG. 1) and, initially, by IROT 112.

The flowchart starts at a Receive Configuration operation 402, wherein IROT 112 (FIG. 1) configures the NVM Control Circuit. In embodiments, the IROT may define NVM Write Protect Policies for one or more requestors.

After operation 402, the NVM Control circuit enters a Wait-NVM-Write-Request operation 404 and waits for an NVM Access request (for example, from Processor 110, FIG. 1).

Responsively to receiving an NVM Write Request (e.g., from processor 110), the NVM Control circuit (or, in embodiments, the IROT) enters an Authenticate-Requestor operation 406, to authenticate the requestor, e.g., by checking a requestor signature (in this case, each requestor sends an authentication code with the request). If so, the NVM Control circuit enters a Select-Policy operation 408 (in some embodiments, the requestor is assumed to be authentic, and operation 406 is skipped).

At the Select Protection-Policy operation 408, the NVM Control circuit selects an NVM Write Protection policy, according to the NVM Write requestor and to the configuration that the IROT has set (in operation 402). The selected policy defines the set of tests that the request should pass to allow an NVM Write. Flowchart 400 illustrates a plurality of such tests and operations, some of which may be skipped when not required by the selected policy. Operations that are skipped are referred to as optional operations, meaning that the NVM Control circuit can either enter the operation or enter the next operation.

After operation 408, the NVM Control circuit enters an optional Start-Time-Window operation 410 to start a time window in which writing to the NVM from the current requestor may be allowed (the time-window will only be active if the policy for the present requestor specifies an NVM-Write time limit).

Next, at a Receive-Address-and-Data operation 412, the NVM Control Circuit receives the target address within the NVM and the NVM Write data (e.g., from processor 110, FIG. 1). In some embodiments, the NVM Control Circuit may receive a start address, followed by a stream of consecutive data words, to be written in consecutive NVM addresses; in other embodiments the NVM Control Circuit receives address/data pairs (or a single address and a single corresponding data word).

The NVM Control Circuit, jointly with the IROT, now enters a series of optional check operations, according to the selected policy. At an optional Check-WP #-Active operation 413, the NVM Control Circuit may check if the WP # input is active; at a subsequent (optional) Check-Requestor-Credentials operation 414, the NVM Control Circuit requests that the IROT checks if the credentials of the requestor meet the credentials defined in the selected policy; at an optional subsequent Check-Address operation 416, the NVM Control Circuit checks if the NVM Write address (provided in operation 412) is within the list of NVM-Write approved address ranges defined for the selected policy; and, at a Check-Time-Window operation 418, the NVM Control Circuit checks whether the time window (started in operation 410) has expired.

If all operations 406, 413, 414, 416 and 418 are either successful or have been skipped, the NVM Control Circuit enters an NVM-Access operation 422, and accesses the NVM at the specified address, for a Read or a for Write operation. If any of operations 406, 413, 414, 416, or 418 fails, the NVM Control circuit enters an Abort NVM Write operation 424 and aborts the NVM Write request; the flowchart then ends (in some embodiments, operation 424 may reset the electronic device; in other embodiments, an operating system will be alerted).

After operation 422 the NVM Control circuit returns to operation 404, to wait for the next NVM Write request.

In summary, according to the example embodiment illustrated in FIG. 4, the NVM Control circuit, responsively to an NVM Write request that the processor sends, will, jointly with the IROT, authenticate the requestor (if needed), select a protection policy according to the requestor and then proceed to execute a series of checks and tests according to the policy. The NVM Control circuit will execute the requested NVM Write operation only if all tests are either successful or not required (skipped).

The operation of flowchart 400, illustrated in FIG. 4 and described herein above, is cited by way of example. Other flowcharts may be used in alternative embodiments. For example, in embodiments, the order of operations 413, 414, 416 and 418 may be changed. In some embodiments some or all the testing operations 413 through 418 may be done at the same time. In an embodiment, the NVM Control circuit performs operations 412 and 413 while still receiving the NVM Write data.

Figure 5:
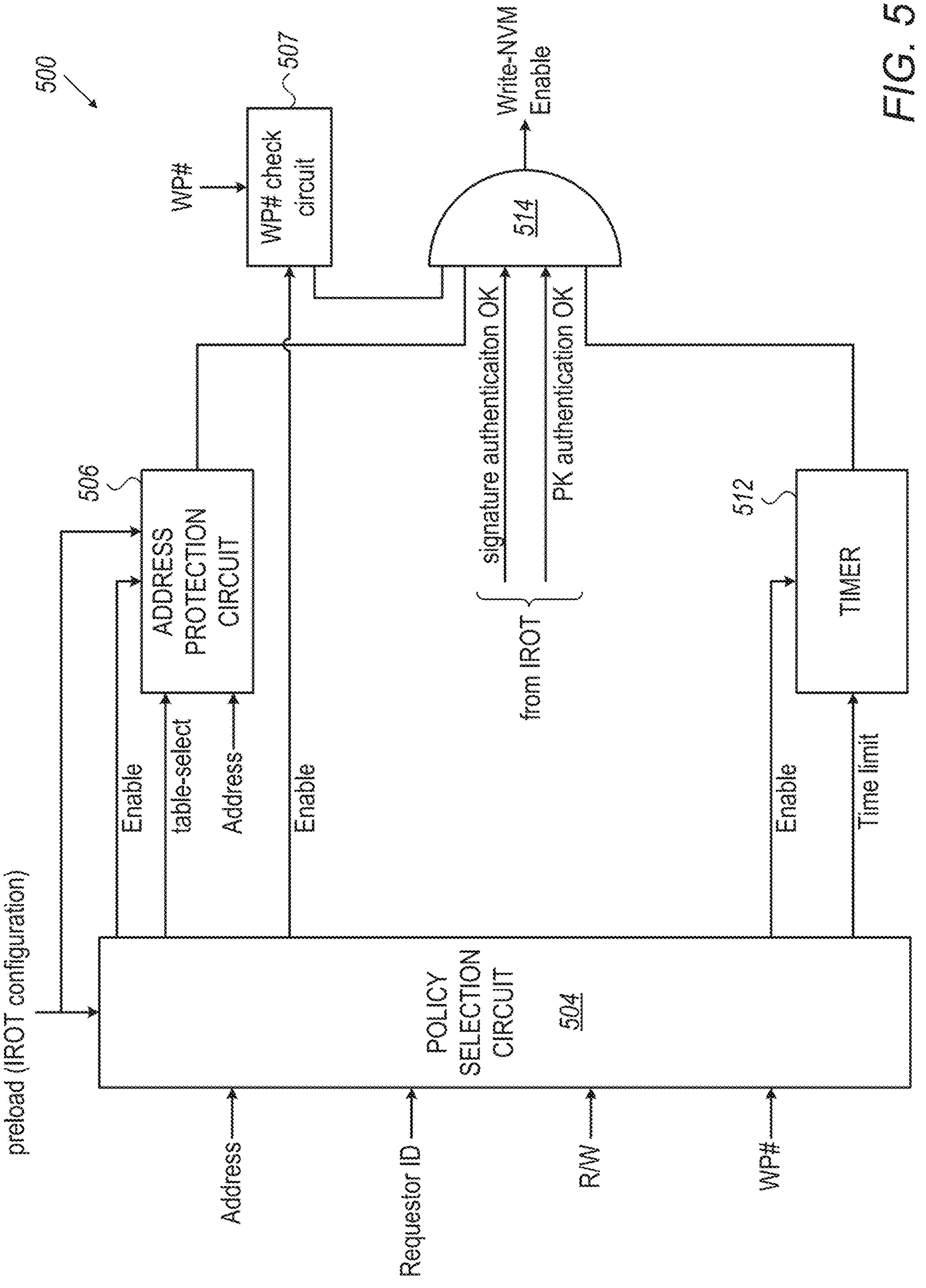
FIG. 5 is a block diagram that schematically illustrates an NVM Write Protection Circuit in an NVM Control circuit, in accordance with an embodiment that is disclosed herein.

FIG. 5 is a block diagram that schematically illustrates an NVM Write Protection Circuit 500 in an NVM Control circuit, in accordance with an embodiment that is disclosed herein. The NVM Protection Circuit receives a plurality of Write-NVM requests from a plurality of NVM-Write requestors, and a single WP # signal to allow NVM write operations. In embodiments, some or all, of the Write-NVM requests are input from Processor 110 (FIG. 1). The Write-NVM requests are input to a Policy Selection circuit 504, which is configured to store multiple write-protection policies for each of the requestors. In an embodiment, the Policy Selection Circuit is preloaded by IROT 112 (FIG. 1); in embodiments wherein the IROT is part of the NVM Controller, the policies are stored in a Policy-Store circuit, in the NVM Controller.

The Policy Selection Circuit selects a protection policy that the IROT has configured for the active requestor. According to the example embodiment illustrated in FIG. 5, the policy may include checking the NVM write address, NVM Source authentication, Public-Key data authentication and checking of an expiration time.

If the selected protection policy includes an address-based protection, the Policy Selection Circuit sends an Enable signal and a Table-Select signal to an Address-Protection circuit 506. In an embodiment, the Address-Protection circuit may comprise protection tables for one or more requestors; the tables are preloaded (e.g., by IROT 112, FIG. 1). The Table-Select signal selects a table according to the requestor, and the Address Protection Circuit 506 enables NVM Write only if the NVM Write Address points to an allowed area within the NVM (or, if the Address-Compare circuit is not enabled). For example, for a first given requestor, the table may specify a protected address range from 0x0000 to 0x7FFF, and for a second given requestor the table may specify that any address greater than or equal to 0xA000, and smaller than 0xAFFFF is protected.

If the selected protection policy includes checking of the WP # input, the Policy Selection Circuit sends an Enable signal to a WP #-Check-Circuit 507, which is configured to enable write-NVM operations if the Enable signal and WP # input are active.

If the selected protection policy includes signature authentication, the IROT authenticates the signature and sends a Signature Authentication OK signal if the authentication succeeds (or, if the selected policy does not require signature authentication). Similarly, if the selected protection policy includes Public-Key authentication, the IROT authenticates the requestor using a preset public-key, and sends a PK Authentication OK signal if the PK authentication succeeds (or, if the selected policy does not require PK authentication).

Lastly, If the selected protection policy includes a time-limit, the Policy Selection Circuit sends an Enable signal and a Time Limit value (according to the requestor) to a Timer circuit 512, which will count clock pulses and enable NVM Write only if the elapsed time (e.g., from the activation of the Enable signal) does not exceed the specified time limit (or if the Timer circuit is not enabled).

An AND gate 514 then activates a Write-NVM Enable signal if i) the Address Protection Circuit 506 output is at logic high, ii) the WP #-Check Circuit 507 enables write-NVM operations; iii) the Signature authentication OK signal is at logic high, iv) the PK authentication OK signal is at logic high, and, (v) the Timer Circuit 512 output signals is at logic-high.

According to the example embodiment illustrated in FIG. 5, the IROT authenticates the signature and/or the PK at all times; the NVM controller uses the authentication results only required (according to the selected policy). In some alternative embodiments, the NVM Controller requests that the IROT authenticates the signature and/or the PK, if such authentication is required by the policy.

The configuration of NVM Write Protection Circuit 500 illustrated in FIG. 5 and described above is cited by way of example. Other configurations may be used in alternative embodiments. For example, in some embodiments, other circuits that authorize NVM Write operations may be used instead of, or in addition to, circuits 506, 508, 510 and 512.

It should be noted that NVM Write Protection Circuit 500 includes circuitry to protect NVM write operations only. In some embodiments, the NVM controller also includes NVM read protection, and NVM Write Protection Circuit 500 is expanded accordingly.

The configurations of electronic device 100, NVM Write Protection Circuit 500, including any subsystems thereof, the structure of NVM Protection Map 300, the operation of flowchart 400, and the method of flowchart 200, illustrated in FIGS. 1 through 4 and described hereinabove, are example configurations, flowcharts and NVM protection maps that are depicted purely for the sake of conceptual clarity. Any other suitable configurations, flowcharts and NVM protection maps can be used in alternative embodiments. The electronic device and components thereof may be implemented using suitable hardware, such as in one or more Application-Specific Integrated Circuit (ASIC) or Field-Programmable Gate Arrays (FPGA), using software, using hardware, or using a combination of hardware and software elements.

In some embodiments, processor 110 comprises a general-purpose programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In embodiments, electronic device 100, including any component thereof, may be implemented using one or more general-purpose programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Example Computing-System Application

FIG. 6 is a block diagram that schematically illustrates a computing system 1000, e.g., a data center or a High-Performance Computing (HPC) cluster, in accordance with an embodiment that is described herein. System 1000 comprises a plurality of subsystems, e.g. multiple processing devices coupled to each other, multiple network devices, and multiple networks, according to at least one embodiment. Computing system 1000 is designed with multiple integrated circuits (referred to as processing devices), where each integrated circuit can include one or more CPUs and GPUs, forming a powerful and flexible architecture.

The various processing devices are interconnected via an NVLink or other high-speed interconnect, enabling high-speed communication between the subsystems, and are also connected through a NIC or DPU to ensure efficient data transfer across computing system 1000 and to one or more external networks 1030, 1036.

The coupling of processing devices through NVLink allows for seamless data exchange and parallel processing, enhancing overall computational performance. The processing devices are connected to multiple networks through one or more NICS or DPUs, enabling the system to handle complex, multi-network tasks with high bandwidth and low latency. This configuration is highly suitable for demanding applications that require significant processing power, such as artificial intelligence (AI), machine learning (ML), and data-intensive computing, while ensuring robust connectivity and scalability across various networked environments. The integrated circuits of the computing system 1000 can include one or more CPUs and one or more GPUS.

FIG. 6 also demonstrates an example architecture of a multi-GPU architecture. As illustrated in the figure, computing system 1000 includes a processing device 1002 with a multi-GPU architecture. In particular, processing device 1002 may be a system-on-chip and includes multiple subsystems such as a CPU 1006, a GPU 1008, and a GPU 1010. CPU 1006 can be coupled to GPU 1008 via a die-to-die (D2D) or chip-to-chip (C2C) interconnect 1012, such as a Ground-Referenced Signaling interconnect (GRS interconnect). CPU 1006 can be coupled to GPU 1010 via a D2D or C2C interconnect 1014. CPU 1006 can also couple to GPU 1008 and GPU 1010 via PCIe interconnects.

CPU 1006 can be coupled to one or more NICs or DPUS, which are coupled to one or more networks. For example, as illustrated in FIG. 6, CPU 1006 is coupled to a first NIC/DPU 1026, which is coupled to a network 1030. CPU 1006 is also coupled to a second NIC/DPU 1028, which is coupled to network 1030. NIC/DPU 1026 and NIC/DPU 1028 can be coupled to network 1030 over Ethernet (ETH), NVLINK or InfiniBand (IB) connections, for example.

Computing system 1000 also includes a processing device 1004 with a multi-GPU architecture. In particular, processing device 1004 includes multiple subsystems including a CPU 1016, a GPU 1018, and a GPU 1020. CPU 1016 can be coupled to GPU 1018 via an D2D or C2C interconnect 1022. CPU 1016 can be coupled to GPU 1020 via a D2D or C2C interconnect 1024. CPU 1016 can also couple to GPU 1018 and GPU 1020 via PCIe interconnects. CPU 1016 can be coupled to one or more NICs or DPUs, which are coupled to one or more networks. For example, as illustrated in FIG. 6, CPU 1016 is coupled to a first NIC/DPU 1032, which is coupled to a network 1036. CPU 1016 is also coupled to a second NIC/DPU 1034, which is coupled to network 1036. NIC/DPU 1032 and NIC/DPU 1034 can be coupled to network 1036 over Ethernet (ETH), NVLINK InfiniBand (IB) connections.

In at least one embodiment, processing device 1002 and processing device 1004 can communication with each other via a NIC/DPU 1038, such as over PCIe interconnects. Processing device 1002 and processing device 1004 can also communicate with each other over a high-bandwidth communication interconnects 1040, such as an NVLink interconnect or other high-speed interconnects.

In various embodiments, system 1000 and/or any of its components, e.g., superchips, NICs/DPUs, and/or individual CPUs or GPUS, as well as network devices such as packet switches (not seen in the figure), may employ the disclosed techniques.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. An electronic device, comprising:
- a memory interface, to communicate with a Non-Volatile memory (NVM); and
- an NVM controller, to:
  - manage reading and writing of data in the NVM;
  - hold one or more Write-Protection (WP) policies that are defined for one or more respective requestors;
  - receive a WP signal indicating whether writing to the NVM is permitted;
  - receive, from a requestor among the requestors, a request to write given data to the NVM; and
  - permit writing of the given data to the NVM only when both (i) a WP policy defined for the requestor that requested the writing of the given data is met, and (ii) the WP signal indicates that writing to the NVM is permitted.

2. The electronic device according to claim 1, further comprising one or more processors, to request access to the NVM.

3. The electronic device according to claim 1, wherein the WP policy specifies a set of addresses in the NVM to which writing is protected.

4. The electronic device according to claim 3, wherein the set of addresses is non-contiguous.

5. The electronic device according to claim 1, wherein the one or more WP policies comprise:
- a first WP policy, defined for a first requestor, the first WP policy specifying a first set of addresses in the NVM to which writing is protected; and
- a second WP policy, defined for a second requestor, the second WP policy specifying a second set of addresses in the NVM to which writing is protected, the second set being different from the first set.

6. The electronic device according to claim 1, wherein, in accordance with the WP policy, the NVM controller is to authenticate an identity of the requestor.

7. The electronic device according to claim 1, wherein, in accordance with the WP policy, the NVM controller is to authenticate written data that is subject to the WP policy.

8. A method for Write Protection (WP) for a Non-Volatile memory (NVM), the method comprising:
- holding one or more WP policies that are defined for one or more respective requestors;
- receiving a WP signal indicating whether writing to the NVM is permitted;
- receiving, from a requestor among the requestors, a request to write given data to the NVM; and
- permitting writing of the given data to the NVM only when both (i) a WP policy defined for the requestor that requested the writing of the given data is met, and (ii) the WP signal indicates that writing to the NVM is permitted.

9. The method according to claim 8, further comprising receiving requests to access the NVM from one or more processors.

10. The method according to claim 8, wherein the WP policy specifies a set of addresses in the NVM to which writing is protected.

11. The method according to claim 10, wherein the set of addresses is non-contiguous.

12. The method according to claim 8, wherein the one or more WP policies comprise:

a first WP policy, defined for a first requestor, the first WP policy specifying a first set of addresses in the NVM to which writing is protected; and a second WP policy, defined for a second requestor, the second WP policy specifying a second set of addresses in the NVM to which writing is protected, the second set being different from the first set.

13. The method according to claim 8, wherein, in accordance with the WP policy, the NVM controller is to authenticate an identity the WP requestor.

14. The method according to claim 8, and comprising, in accordance with the WP policy, authenticating written data that is subject to the WP policy.

* * * * *